United States Patent [19]
Rojey

[11] 4,037,426
[45] July 26, 1977

[54] COLD PRODUCING PROCESS

[75] Inventor: Alexandre Rojey, Vanves, France

[73] Assignee: Institut Francais du Petrole, Rueil-Malmaison, France

[21] Appl. No.: 694,448

[22] Filed: June 9, 1976

[30] Foreign Application Priority Data

June 9, 1975 France .................. 75.18174

[51] Int. Cl.² .......................... F25B 5/00; F25B 7/00; F25B 39/02
[52] U.S. Cl. ........................ 62/117; 62/335; 62/525
[58] Field of Search .......... 62/117, 504, 525, 335, 62/40

[56] References Cited
U.S. PATENT DOCUMENTS

| | | |
|---|---|---|
| 3,158,010 | 11/1964 | Kuerston .................. 62/525 |
| 3,300,991 | 1/1967 | Carney ..................... 62/335 |
| 3,427,817 | 2/1969 | Rietdijk .................... 62/117 |
| 3,898,857 | 8/1975 | Bourquet et al. ......... 62/117 |
| 3,964,891 | 6/1976 | Krieger .................... 62/335 |

Primary Examiner—Lloyd L. King
Attorney, Agent, or Firm—Millen & White

[57] ABSTRACT

Process for producing cold by evaporation of a cooling fluid, comprising the steps of compressing a gaseous phase of the cooling fluid and dissolving it, at least partly, in a liquid solvent, precooling the resulting solution by an external fluid and further cooling it by heat exchange with a heavy and a light liquid phase, said heavy liquid phase being then recycled as liquid solvent for the gaseous phase of the cooling fluid, said light liquid phase being vaporized to produce cold, thereafter used for cooling said solution and recycled as gaseous phase of the cooling fluid.

14 Claims, 2 Drawing Figures

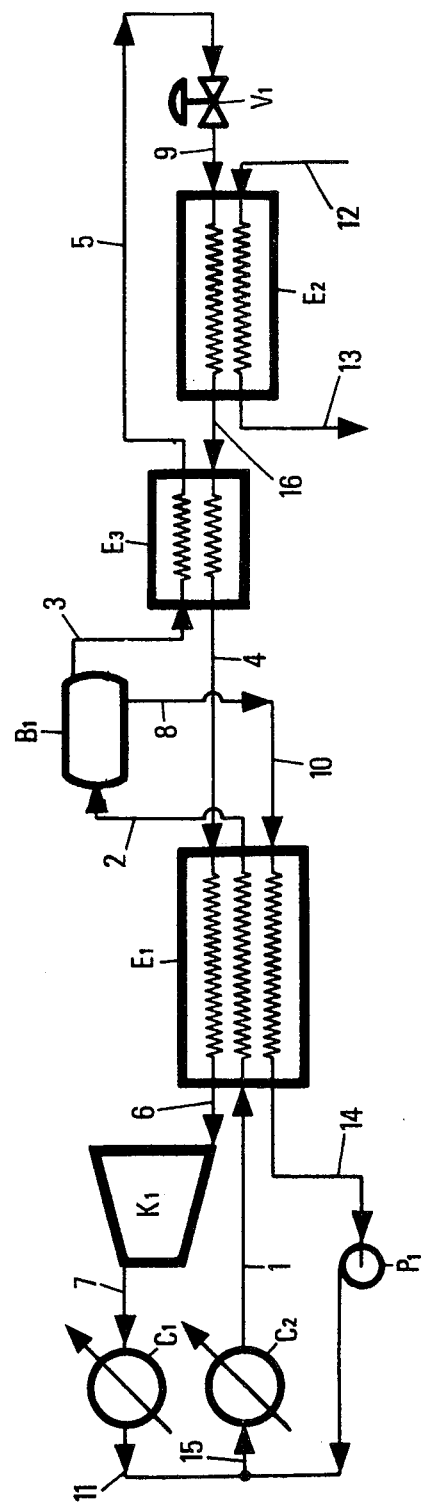
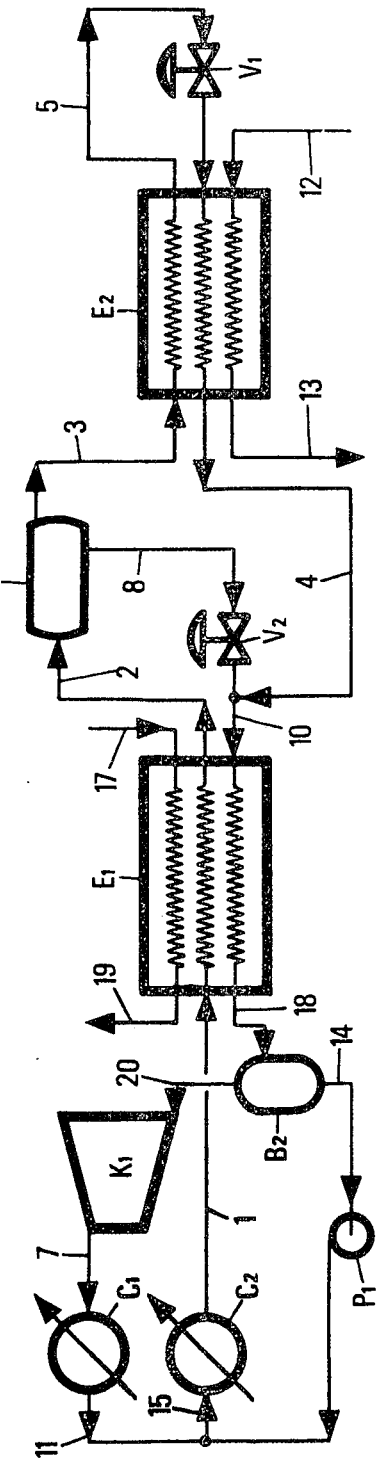

COLD PRODUCING PROCESS

The main application of cold in the industry concerns the liquefaction and the fractionation of light gases. These operations require substantial power consumption. Thus the liquefaction of natural gas in view of its transportation by methane-tanker results in a self-consumption amounting to 15%. The cold fractionation of light effluents from a steam-cracker also requires high compression powers. It is accordingly important to develop less power consuming cold liquefaction and fractionation techniques.

The most common method in this type of application consists of using the cascade type system. Its use in suggested by the fact that, in order to obtain temperatures of about $-100°$ C and below, it is necessary to expand a liquid constituent whose boiling temperature is lower than the desired temperature and whose critical temperature is, in this case, generally lower than room temperature. Thus, in order to operate a demethanizer, a propylene-ethylene cascade may be used, for example. For liquefying natural gas a propane-ethylene-methane cascade may be used. The cascade requires numerous equipments such as compressors and exchangers which result in large investments.

A substantial improvement has been achieved by using in the cascade cycle, instead of pure constituents, a mixture of several constituents. It is thus possible, by means of a single circuit, comprising only one compressor, to liquefy and sub-cool natural gas to a temperature from $-160°$ to $-170°$ C. This is the so-called incorporated cascade system. It is possible, by this way, to reduce the quantity of equipment and the amount of the investment. However this procedure does not avoid the successive heat exchanges which are required by the cascade system. On the other hand, the condensation of the mixture occurs within a wide temperature range which is unfavourable to the yield of the cycle.

The object of this invention is to provide a system avoiding these drawbacks to a large extent, with the advantage of a more simple arrangement whereby investments may be reduced.

The invention concerns a process for cold production by evaporating at low temperature a refrigerating fluid passing from a gaseous state to a liquid state or vice-versa and characterized in that it consists of: (a) compressing, in a compression zone, a gaseous phase of a refrigerating fluid, (b) dissolving, at least partly, the compressed gaseous phase in a solvent phase to obtain a solution, (c) transferring at least a portion of the compression heat and of the dissolution heat to an external cooling fluid, (d) cooling the solution to obtain two liquid phases by separation of the constituents of the mixture, (e) separating the light liquid phase from the heavy liquid phase, (f) recycling to step (b) the heavy liquid phase of high solvent content, in order to dissolve an additional amount of gaseous phase, (g) expanding the light liquid phase and then vaporizing it so as to produce cold, (h) feeding back the vaporized light liquid phase to the compression zone.

The process of the invention is thus based on the observation that, in order to condense a light gaseous constituent or a mixture of light gaseous constituents of a refrigerating fluid at room temperature, and accordingly with a reduced comsumption of thermal energy at low temperature, it is possible to dissolve it under pressure in a solvent, said solvent being preferably a polar solvent. The further lowering of the temperature results, as a rule, in a decrease of the solubility of the light constituent and it can be observed that the constituents of the mixture separate. It is thus possible to obtain the light constituent in a liquid state at low temperature and subsequently to vaporize it at low temperature to produce cold. After vaporization, the light gaseous constituent is recompressed and dissolved again in the solvent.

FIG. 1 shows the diagram of one embodiment of the process of the invention.

FIG. 2 shows the diagram of a second embodiment of the process of this invention.

In duct 1, the refrigerating mixture is essentially in liquid phase at a temperature close to the temperature of the external cooling medium, generally water or air, and under pressure, the pressure being preferably from 12 to 70 atmospheres.

The refrigerating mixture comprises at least one light constituent and at least one heavy constituent. The light constituent, which is gaseous under normal conditions of temperature and pressure, may be, for example, a hydrocarbon having preferably from 1 to 4 carbon atoms, e.g. methane, ethane or propane and/or a halogenated hydrocarbon having preferably 1 or 2 carbon atoms, e.g. a fluorinated and/or chlorinated hydrocarbon, particularly of the freon type and/or one or more gases commonly used in the refrigeration processes, such as nitrogen, helium, hydrogen, ammonia, carbon monoxide.

The invention is particularly advantageous (in order to obtain very low temperatures) and unexpected in the case where the refrigerating fluid comprises a gas such as methane, ethane, ethylene, tetrafluoromethane, and chlorotrifluoromethane which cannot be condensed by mere compression at the usual working temperature (room temperature) which may reach 50° C.

The heavy constituent is a constituent condensable at room temperature and preferably liquid under the normal conditions of temperature and pressure, acting as a solvent, preferably a polar solvent which may be for example an alcohol, a ketone, an amine or a nitrile.

The solvent may be, for example, R—OH, R—CO—R', R—CN, R—NH$_2$, R—NH—R', R and R' being alkyl radicals containing from 1 to 3 carbon atoms, preferably methanol, ethanol, acetone, acetonitrile, ethylamine, dimethylamine and propionitrile.

The solvent may also be an amide

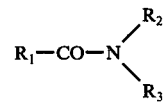

wherein $R_1$ to $R_3$ are hydrogen and/or alkyl radicals, for example dimethylformamide.

Mixtures of solvents may also be used.

By room temperature it is meant a temperature from 0° to 50° C, usually about 20° C, the selected temperature in each case being preferably close to that of the available cooling source (air or water, for example).

Similarly, the normal conditions of temperature and pressure are usually 20° C and one atmosphere, but they may also correspond to a much wider range. As a matter of fact, the important conditions are not those of the external medium but those of the fluids circulating inside the pipes (for example, pipes 15 and 1 of FIG. 1).

The heat exchange zones $E_1$ and $E_2$ of FIG. 1 are of the wall type, in order to avoid any admixing of the fluids and to allow their circulation under different pressures on both sides of the wall.

Following the path 1–2, the obtained solution is cooled in an exchanger $E_1$ by exchange with the recycled heavy phase portion (lines 10–14) and the expanded light phase (line 4–6). By this cooling it is possible to separate in the flask $B_1$ a heavy liquid phase which is recycled (lines 8-10-14) and a light liquid phase which, after cooling in exchanger $E_3$, following the path 3–5 in contact with the expanded light phase (line 16-4), is expanded to a pressure of 1 to 10 atmospheres and preferably close to the atmospheric pressure through valve V1 and is vaporized in exchanger $E_2$ when following the path from 9 to 16 while transferring cold to the fluid to be cooled which enters by duct 12 and is discharged through duct 13. After passage through exchanger $E_3$ and then through exchanger $E_1$, the expanded light phase is conveyed through duct 6 to compressor $K_1$ and sent through line 7 to exchanger $C_1$ where it is cooled by the cooling external medium (air, water), admixed online (line 11) with the heavy phase recycled by means of a pump $P_1$, the dissolution heat being transferred to the external cooling medium by means of exchanger $C_2$, the mixture entering said exchanger through duct 15 and being discharged through duct 1.

The number or the arrangement of the equipment such as the means for thermal exchange, compression, expansion, the ducts and the collecting tanks may be varied, provided that they are in conformity with the basic principle of the invention.

The mixture sent through line 1 to exchanger $E_1$ is preferably essentially liquid; it may however happen that a minor fraction of the gas be still in the gaseous phase but, although this situation must be preferably avoided, it is however not too troublesome since this gaseous fraction will be condensed during the cooling step in exchanger $E_1$ (this condensation will occur at low temperature and, accordingly, under less economical conditions than for the remaining portion of the gas).

The invention is illustrated by the following examples:

EXAMPLE 1

This example concerns the embodiment shown in FIG. 1. The composition of the refrigerating mixture at point 1, at the outlet from exchanger 2 is as follows, in molar proportions: ethane: 0.4 — methanol: 0.6.

The temperature of the mixture is 30° C and its pressure 34.5 atmospheres. The flow rate is 2.44 metric tons per hour.

The mixture is conveyed to an exchanger E1 from where it is discharged at a temperature of −60° C. Due to the temperature decrease, a separation of the mixture constituents occurs and the mixture is sent through duct 2 to a decantation flask B1.

The light phase is formed of 92% ethane and 8% methanol. It is discharged through duct 3 and expanded through valve V1 to a pressure of 1.6 atmosphere. At the outlet of exchanger E2, ethane is entirely vaporized and is at a temperature of −82° C. The amount of cold produced is $22 \times 10^6$ g. cal. and it is used to cool a fluid entering through line 12 and discharged through line 13. The light fraction is sent through duct 16 to exchanger 3 from where it is discharged at a temperature of −70° C and then conveyed, through duct 4, to exchanger E1 from where it is discharged, through duct 6, at a temperature of 23° C and conveyed from there to the compressor K1. In the compressor K1, it is compressed up to a pressure of 36 atmospheres. The compression is performed in three steps with intermediate cooling. At the outlet of the last step, the gas is at a temperature of 92° C. It is sent, through duct 7, to the cooling exchanger C1 from where it is discharged at a temperature of 32° C. The heavy fraction issued from the decantation flask B1 is discharged through duct 8 and sent to exchanger E1 from where it is discharged at a temperature of 25° C. It is taken over by pump P1 and admixed in-line with the gaseous fraction issued from exchanger C1 and conveyed through duct 11. Gaseous ethane is dissolved in the liquid methanol and the liquid is sent to the cooling exchanger C2 so as to remove the dissolution heat.

EXAMPLE 2

In the embodiment of this example, a mixture of ethane and propane is used as refrigerant and the process is conducted according to the diagram shown in FIG. 2. At the outlet of the condenser, the refrigerating mixture conveyed through duct 1 has the following molar composition: ethane: 0.3, propane: 0.2, methanol: 0.5.

The mixture is at a temperature of 30° C, under a pressure of 30 atmospheres. The flow rate is 3.17 metric tons per hour.

The mixture is conveyed to exchanger E1 from where it is discharged at a temperature of −55° C. As a result of the temperature decrease, a separation of the constituents of the mixture has occured and the mixture is sent through duct 2 to the decantation flask B1. The light liquid phase is conveyed through duct 3 to exchanger E2 from where it is discharged at a temperature of −73° C through line 5. It is expanded through valve V1 to a pressure of 1.6 atmospheres and then sent to exchanger E2 in which it starts being vaporized at a temperature of −78° C. The amount of cold thus produced is $20 \times 10^6$ g. cal. and is used to cool a fluid entering line 12 and discharged through line 13. The heavy fraction issued from flask B1 is expanded to a pressure of 1.4 atmosphere through the expansion valve V2 and then is admixed on-line with the light fraction issued through duct 4 from exchanger E2.

The mixture is conveyed through duct 10 to exchanger E1 and is discharged from duct 18 at a temperature of 24° C while having produced $50 \times 10^6$ g. cal. which are used to cool a fluid entering line 17 and discharged through line 19. The mixture is sent through duct 18 to the separating flask B2. The gaseous phase issued from flask B2 is sent through line 20 to compressor K1 in which it is compressed up to a pressure of 30 atmospheres. The compression is conducted in three steps with intermediary cooling. At the outlet from the last stage, the gas is at a temperature of 85° C. It is sent, through duct 7, to the cooling exchanger C1 from where it is discharged at a temperature of 32° C (line 11). The liquid fraction issued from flask B2 is taken again by pump B1 (line 14) and admixed in-line with the gaseous fraction conveyed through duct 11. The gaseous mixture is dissolved in liquid methanol and the mixture is sent, through line 15, to the cooling exchanger C2 so as to remove the dissolution heat,.

In this example, the use of a mixture of two constituents in gaseous phase and the expansion of the heavy phase obtained by separation of the mixture constituents has resulted in the production of cold at two different temperature levels.

What I claim is:

1. A process for producing cold by evaporation at low temperature of a refrigerating fluid passing from a gaseous state to a liquid state or vice-versa, comprising the steps of (a) compressing, in a compression zone, a gaseous phase of refrigerating fluid so as to obtain a compressed gaseous phase and dissolving it, at least partly, in a liquid solvent phase so as to obtain a solution, transferring at least a portion of the compression heat and of the dissolution heat to an external cooling fluid, (b) cooling the solution from step (a) as indicated in steps (d) and (f), so as to obtain two liquid phases by separation of the mixture constituents, (c) separating the light liquid phase from the heavy liquid phase, (d) placing the heavy liquid phase from step (c) in heat exchanger relationship with the solution to be cooled from step (b) and then sending said heavy liquid phase, as solvent phase, to step (a) for dissolving a further amount of compressed gaseous phase, (e) expanding the light liquid phase and vaporizing it so as to produce cold, (f) placing the vaporized light phase from step (e) in heat exchange relationship with the solution to be cooled from step (b) and feeding back said vaporized light fraction to the compression zone as gaseous phase of the refrigerating fluid.

2. A process according to claim 1 in which the refrigerating fluid is a gas which is not condensable at room temperature.

3. A process according to claim 1 in which the refrigerating fluid comprises at least one component pertaining to the class of hydrocarbons.

4. A process according to claim 1, in which the refrigerating fluid comprises at least one chlorinated and/or fluorinated hydrocarbon.

5. A process according to claim 1 in which the refrigerating fluid comprises methane, ethylene, ethane, chlorotrifluoromethane or tetrafluoromethane.

6. A process according to claim 1, in which the solvent is a polar solvent pertaining to the class of alcohols, ketones, amines or nitriles.

7. A process according to claim 6 in which the solvent is methanol.

8. A process accoring to claim 6 in which the solvent is acetonitrile.

9. A process accordint to claim 1, in which the refrigerating fluid is compressed to a pressure from 12 to 70 atmospheres.

10. A process according to claim 1, in which the separated light phase obtained from step (e) is expanded to a pressure from 1 to 10 atmospheres.

11. A process according to claim 1, in which the light liquid phase obtained and separated in step (c) is subjected to sub-cooling before being expanded in step (e).

12. A process according to claim 1, in which the gaseous phase is compressed in a compression zone, admixed with a liquid solvent in which it dissolves at least partly, the compression and dissolution heat being transferred at least partly to an external cooling fluid in at least one exchange zone, the resulting solution is circulated in a heat exchange zone A, so as to obtain two liquid phases, respectively a light phase and a heavy phase which are separated, the heavy phase being sent to the exchange zone A and then reused as solvent and the light phase being sent to a heat exchange zone B and then expanded and let to vaporize so as to produce cold and finally recycled in a gaseous state to the compression zone by passing through the exchange zone B and then through the exchange zone A.

13. A process according to claim 1, in which the refrigerating fluid comprises at least two components of different boiling temperatures, said refrigerating fluid being compressed in a compression zone, admixed with the liquid solvent in which it is at least partly dissolved, at least one portion of the compression and dissolution heats being transferred to an external cooling fluid in at least one exchange zone, the mixture being circulated in a heat exchange zone A so as to obtain a light liquid phase and a heavy liquid phase which settle, the light non-expanded phase being sent to the heat exchange zone B and then expanded and vaporized so as to produce cold and sent in the gaseous phase through the heat exchange zone B, the heavy phase being expanded and admixed with the gaseous light phase issued from the heat exchange zone B, the resulting mixture being sent through the heat exchange zone A and separated in a gaseous fraction and a liquid fraction, the gaseous fraction being sent to the compression zone and the liquid fraction, consisting essentially of the solvent, being taken again by a pump and readmixed with the gaseous phase issued from the compression zone.

14. A process according to claim 1, in which, during step (f), the vaporized light phase is placed in heat exchange relationship, first with the non-expanded light liquid phase obtained in step (c) before said phase is sent to the expansion and vaporization step (e), then with the solution to be cooled from step (b), before the light phase is delivered to the compression zone.

* * * * *